(12) United States Patent
Lesecq et al.

(10) Patent No.: US 7,967,266 B2
(45) Date of Patent: Jun. 28, 2011

(54) HOOK FOR RECEIVING A HINGING JOURNAL

(75) Inventors: Jean-Pierre Lesecq, Cormeilles en Parisis (FR); Emile Droche, La Garenne Colombes (FR); Jean-Pierre Cordola, Graches (FR)

(73) Assignee: I.T.W. de France, Beauchamp (FR)

( * ) Notice: Subject to any disclaimer, the term of this patent is extended or adjusted under 35 U.S.C. 154(b) by 401 days.

(21) Appl. No.: 12/159,289

(22) PCT Filed: Nov. 2, 2006

(86) PCT No.: PCT/IB2006/003099
§ 371 (c)(1),
(2), (4) Date: Jun. 26, 2008

(87) PCT Pub. No.: WO2007/080445
PCT Pub. Date: Jul. 19, 2007

(65) Prior Publication Data
US 2008/0301915 A1    Dec. 11, 2008

(30) Foreign Application Priority Data

Jan. 9, 2006  (FR) ..................... 06 00154

(51) Int. Cl.
*A47B 96/06* (2006.01)
(52) U.S. Cl. ............. 248/230.7; 248/316.7; 248/231.81; 296/97.9
(58) Field of Classification Search .......... 248/200, 248/205.1, 309.1, 314, 316.7, 230.6, 230.7, 248/231.71, 231.81, 305, 306; 296/97.9, 296/97.11; 24/456, 531, 530, 563, 545, 535
See application file for complete search history.

(56) References Cited

U.S. PATENT DOCUMENTS

| 3,944,177 | A  |   | 3/1976  | Yoda |
| 5,358,299 | A  | * | 10/1994 | Seto .............................. 296/97.9 |
| 5,397,088 | A  | * | 3/1995  | White ......................... 248/309.1 |
| 5,618,015 | A  |   | 4/1997  | Morini |
| 5,711,571 | A  |   | 1/1998  | Renahy et al. |
| 6,322,126 | B1 | * | 11/2001 | Kraus ........................... 296/97.9 |
| 6,324,732 | B1 | * | 12/2001 | Arisaka et al. ................. 24/458 |
| 6,607,233 | B1 | * | 8/2003  | Beaver et al. ................. 296/97.9 |
| 6,863,331 | B2 | * | 3/2005  | Beaver et al. ................. 296/97.9 |
| 7,798,552 | B2 | * | 9/2010  | Takai ............................ 296/97.9 |
| 2001/0007394 | A1 | * | 7/2001 | Beaver ........................ 296/97.9 |
| 2002/0017800 | A1 | * | 2/2002 | Ichikawa et al. ............. 296/97.9 |

FOREIGN PATENT DOCUMENTS

GB       2058192 A    4/1981

OTHER PUBLICATIONS

ISR for PCT/IB2006/003099 dated Aug. 9, 2007.

* cited by examiner

*Primary Examiner* — A. Joseph Wujciak, III
(74) *Attorney, Agent, or Firm* — Lowe Hauptman Ham & Berner LLP

(57) ABSTRACT

The hook includes a body having a receiving space for receiving the journal and, within the body, a clip for coupling to the journal and an actuator for actuating the clip. The clip includes a semi-cylindrical wall, two flaps and two hinges for pivotal hinging of each flap to a respective one of the walls. The clip has a closed position in which the flaps have come towards each other to form with the wall a bearing for the journal, and an open position in which the flaps are separated for freeing and insertion of the journal from/into the receiving space. The passage from one position to the other is actuated by the actuator by pressing the journal on the wall.

20 Claims, 9 Drawing Sheets

HOOK FOR RECEIVING A HINGING JOURNAL

RELATED APPLICATIONS

The present application is based on International Application Number PCT/IB2006/003099 filed Nov. 2, 2006, and claims priority from French Application Number 0600154 filed Jan. 9, 2006, the disclosure of which is hereby incorporated by reference herein in its entirety.

TECHNICAL FIELD

The present invention generally relates to hooks for receiving a hinging journal.

BACKGROUND

Such hooks are known that are fixed to the ceiling of a vehicle to receive the journal of a pivoting sun visor. The journal may be withdrawn from the hook to position the sun visor against a door window pane.

Such a hook for receiving a journal is known in particular from the document FR 2 761 127 which comprises a body having a housing for receiving said journal and an opening for the insertion of said journal in said housing. Such hooks enable the insertion and holding of the journal in the housing. The journal is extracted from the hook simply by pulling in the opposite direction to the direction of insertion.

Any pulling of this kind, even accidental, drives the journal out of its housing.

SUMMARY

The invention is directed to providing a receiving hook of this type not having this drawback, while being particularly simple and convenient to manufacture and use.

To that end, the invention provides a hook for receiving a journal for hinging an item such as a sun visor, comprising a body having a housing for receiving said journal and an opening for inserting said journal in said housing, characterized in that it further comprises, within said body, a clip for coupling to said journal adapted to delimit said housing and means for actuating said clip, said clip comprising a semi-cylindrical wall and two flaps, said wall having a bearing surface for said journal and each said flap having a contact surface extending onwards from said bearing surface, said clip further comprising, at each junction between the bearing surface and a respective contact surface, a hinge for pivotally hinging a said respective flap with respect to said wall, each said contact surface having an end remote from a respective said hinge, said clip having a closed position in which said flaps have come towards each other and in which said contact surfaces and said bearing surface form a bearing for said journal, and an open position in which the distance separating said ends is greater than the distance separating said hinges for freeing, from said housing, and insertion, into said housing, of said journal, the passage from one to the other of said positions being actuated by said actuating means by pressing of said journal on said wall.

The journal is thus held by the clip which prevents any freeing of the journal so long as the latter remains in its closed position, the journal only being able to be freed by actuating the passage of the clip from its closed position to its open position.

If the journal is pulled upon, it remains held in the clip; only pressing beforehand in the direction of insertion, by making the clip move to its open position, enables freeing of the journal which can be pulled upon to free it.

When the clip is in its closed position, the form of the bearing and contact surfaces makes it possible to trap the journal while enabling it to rotate around its main axis.

According to features of implementation that are particularly simple and convenient both with respect to manufacture and use: [0011] each said flap comprises a rib situated away from said hinge on its opposite surface to said contact surface; and possibly [0012] said clip is mounted in a casing having two opposite surfaces, each rib of said clip being held against a respective one of said opposite surfaces when said clip is in its closed position whereas each said rib is free when said clip is in its open position; and/or [0013] the clip is of one piece, said hinges being formed by a thinner portion than said wall and said flaps; and/or [0014] said clip is of molded plastics material; and possibly [0015] said clip is of elastomer; and/or [0016] said actuating means comprise a slide and a casing mounted in said body, said slide being mounted in said casing and comprising a cam track within which a follower which said casing comprises is adapted to be moved; and possibly [0017] said clip comprises means for snap engagement onto said slide; and possibly [0018] said body and said casing comprise means for fitting said casing into said body; and/or [0019] said casing comprises means for elastic wedging of said casing into said body; and possibly [0020] said elastic wedging means comprise a flexible leg extending from one wall of said casing; and/or [0021] said hook comprises a foot for fixing to a support; and possibly [0022] said hook comprises a casing, a slide mounted in said casing, said clip being fixed onto said slide, and a base delimiting a circular opening, said foot comprising a lock having a plate adapted to obturate said opening, said body and said plate delimiting a space in which are disposed said casing, said slide and said clip; and possibly [0023] said casing comprises a flexible leg forming elastic wedging means for said casing, said flexible leg extending from a wall of said casing as far as said plate; and/or [0024] said plate and said base comprise means for locking said body onto said lock; and/or [0025] said fixing foot comprises: [0026] a part comprising two flexible legs and a plate for bearing against said support, to which said flexible legs are attached, and which is provided with an opening of predetermined outline issuing between said flexible feet, said feet assuming a resting position in the absence of urging and, by moving apart from said resting position, assuming a position of locking onto said support; [0027]a lock comprising a mast adapted to cooperate with said part such that said mast can be introduced, starting from its free end, through said opening and such that said hook permits a locking configuration in which said mast holds said flexible feet apart in said locking position, and [0028] means for snap engagement of said lock and of said part; and possibly [0029] said lock and said part are adapted to cooperate such that, from said locking configuration, the lock can pivot coaxially with respect to said part, to attain an unlocking configuration in which said mast allows said flexible feet to come together to attain said resting position.

BRIEF DESCRIPTION OF THE DRAWINGS

The features and advantages of the invention will appear from the following description, given by way of preferred but non-limiting example, with reference to the accompanying drawings in which.

DETAILED DESCRIPTION

Figure 1:
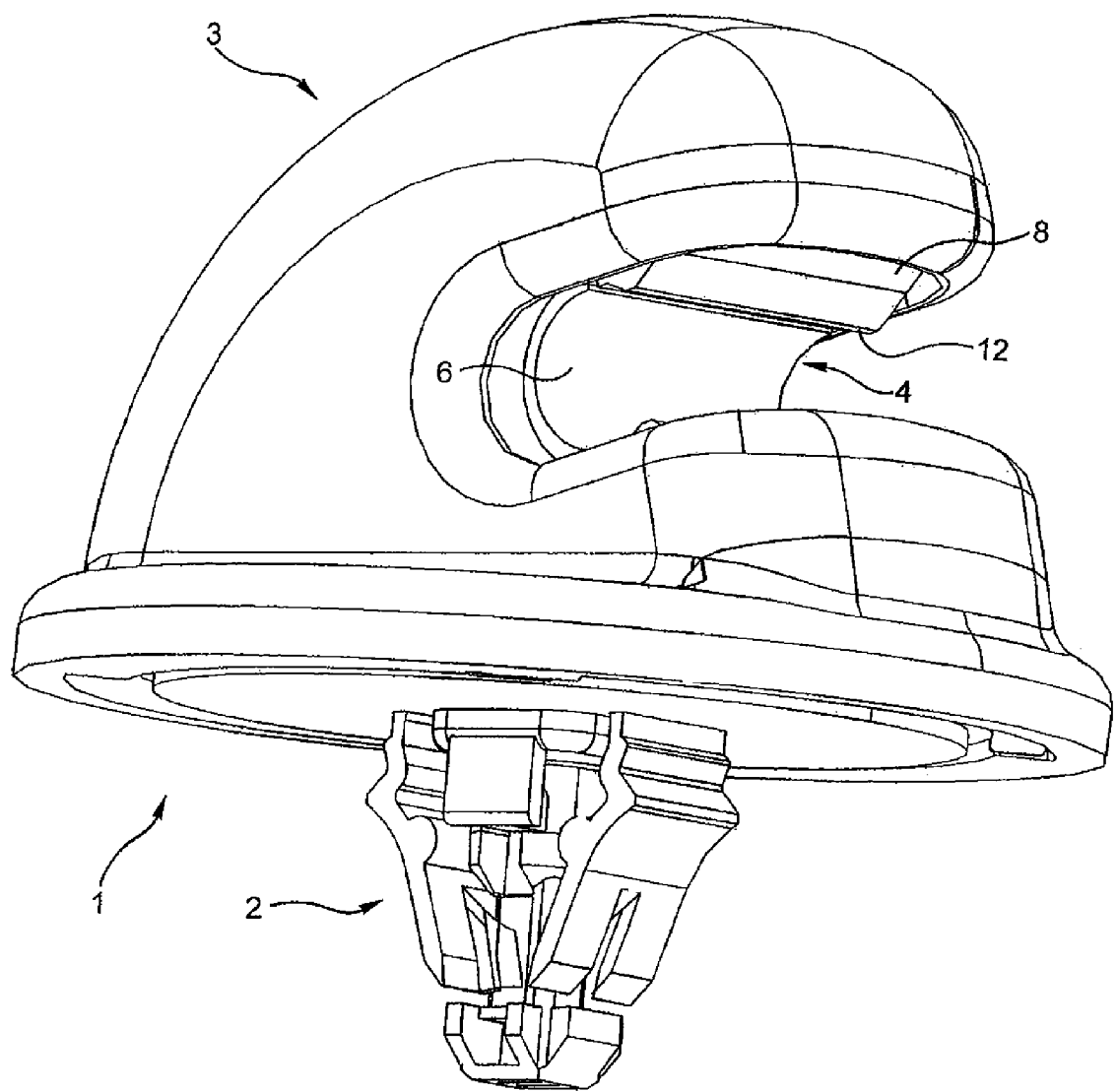
FIG. 1 is a perspective view of a hook according to the present invention.

The hook 1 is an item of molded plastics material comprising a fixing foot 2, a body 3, a clip 4 and means for actuating the clip.

The clip 4 is molded in one piece from plastics material, here an elastomer. It comprises a receiving wall 6 of C-shape so as to form a half-bearing for a cylindrical journal. Wall 6 is of constant thickness.

The inner surface of the wall 6 is a smooth surface adapted to be in contact with the journal. It delimits a receiving space for the journal.

The clip 4 also comprises catching portions on respective opposite sides of the wall 6 each having a flap 7 and a ramp 8.

Each catching portion is hinged to the wall 6 by a hinge 9 which extends axially such that the catching portions can move towards or away from each other. The clip 4 thus has an open position, at rest, in which the catching portions are situated away from each other, and a closed position in which those portions have come towards each other. The thickness of the hinges 9 is generally half the thickness of the hinges of the wall 6.

The flaps 7 have a contact surface 10 extending onwards from the inner surface of the wall 6. In the closed position (FIGS. 3, 4, 13 and 15), each surface 10 is oriented away from the hinge 9 and towards the other surface 10 such that the flaps 7 partly enclose the receiving space of the journal.

The clip 4 is continued from each flap 7 by the ramp 8. This ramp 8 comprises a flat wall of which the free end forms the arc of a circle. Each of these walls comprises a surface 11 extending onwards from a surface 10, a bend line 12 extending between a surface 10 and a surface 11. The free ends of the two ramps 8 are further apart from each other than are the two bend lines 12. Thus, looking at the reception space of the clip in the closed position, an observer first of all sees the two ramps 8 and a constriction adjacent the bend lines 12 behind which extends the generally cylindrical receiving space.

Figure 3:
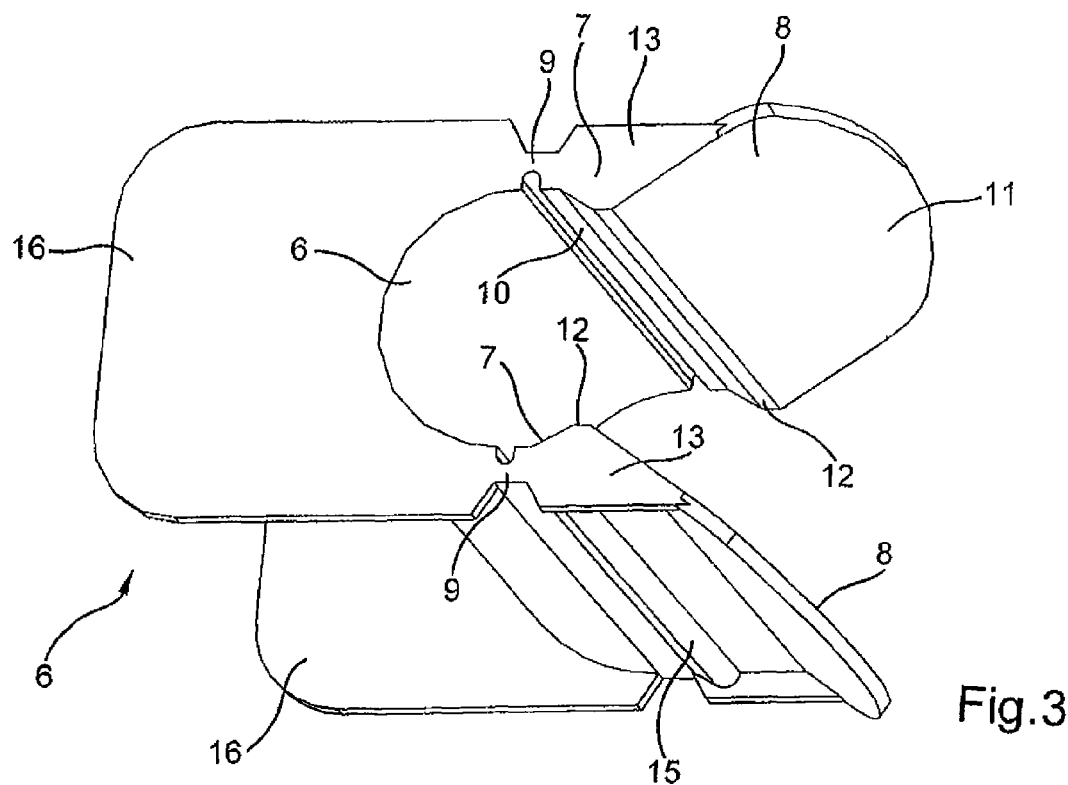
FIG. 3 is a perspective view of the clip of that hook.
Figure 4:
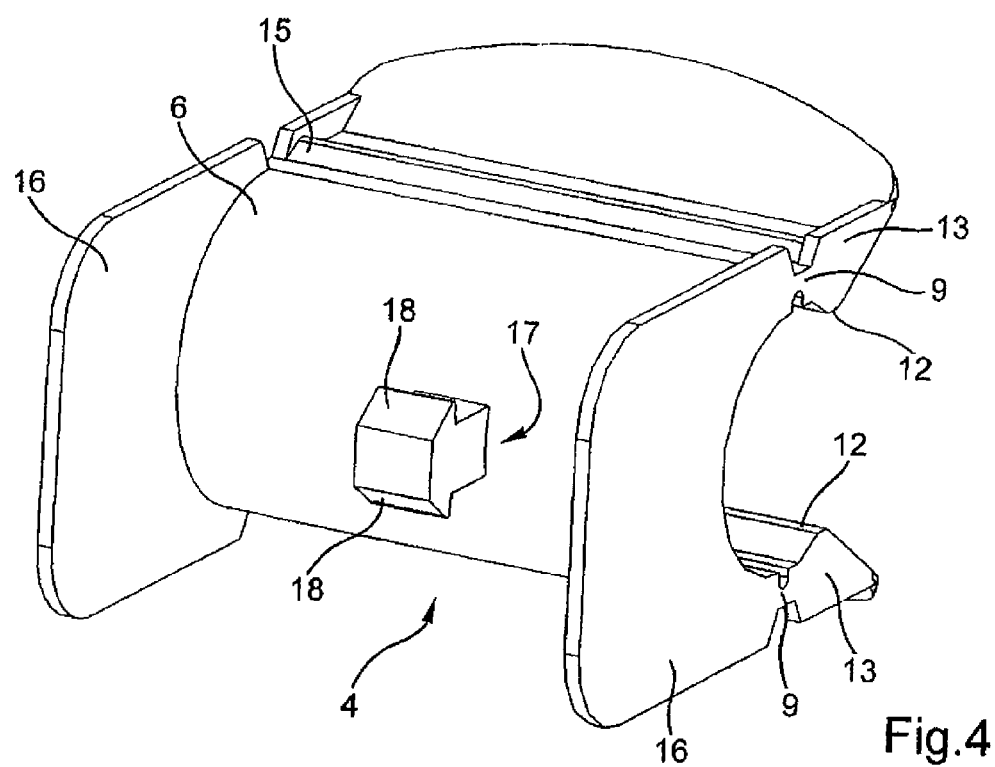
FIG. 4 is a perspective view of the clip from another angle.
Figure 5:
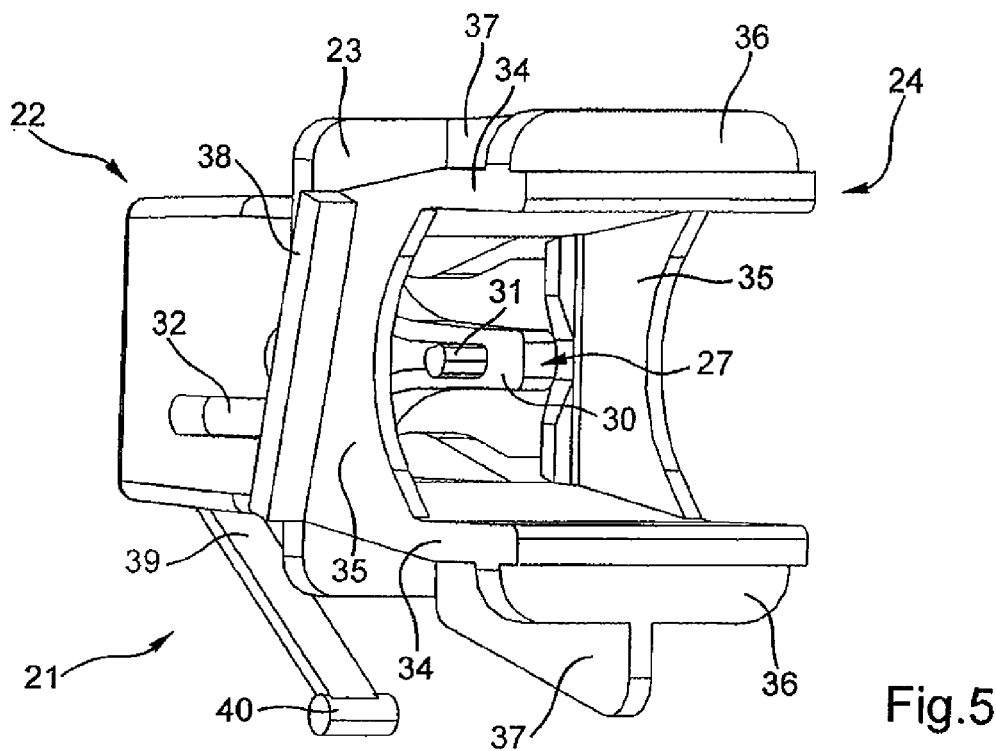
FIGS. 5 and 6 are perspective views of the casing visible in FIG. 2, from two different angles.

Each flap 7/ramp 8 pair is adapted to pivot through a limited course of travel about the axis of the hinges 9. In closed position, as represented in FIG. 3, the bend lines 12 are spaced apart by a specific distance whereas in an open position (FIG. 16), the bend lines 12 are further spaced apart such that the opening angle of the reception space is greater.

In the closed position, the distance between the bend lines 12 is less than the diameter of the cylinder in which is defined the inner surface of the wall 6. In the open position, the distance between the bend lines 12 is greater than that diameter.

Each flap 7 comprises a rim 13 which extends from the hinge 9 to the ramp 8.

Each flap 7 comprises a rib 15 on its opposite surface to surface 10, which extends from one rim 13 to the other. The thickness of each rib 15 is slightly less than the height of the rims 13.

At each lateral extremity of the wall 6 a flange 16 extends transversely which on one side has the semi-circular form of the section of wall 6 and which, for the remainder thereof, has a generally rectangular form with two rounded corners.

On the outer face of wall 6, there extends at the center a snap engaging stud 17 which has a cubic base on which is mounted a detent of truncated triangular section with, on respective opposite sides of a flat surface, two guide slopes 18 towards the outer surface of the wall 6. Between each slope 18 and the cubic base there is a shoulder serving for the snap engagement in cooperation with other means described below.

Figure 2:
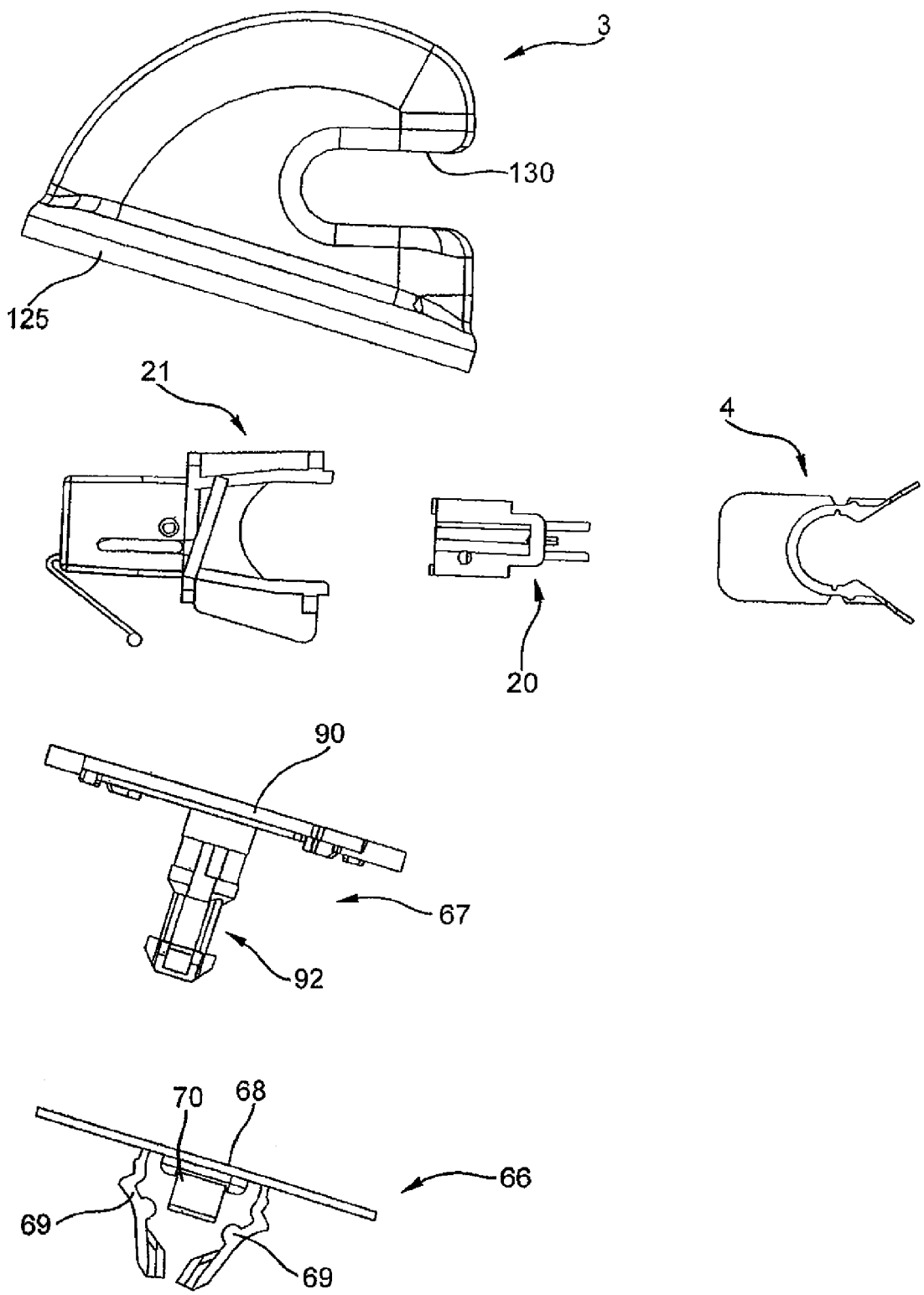
FIG. 2 is an exploded side elevation view of that hook.
Figure 7:
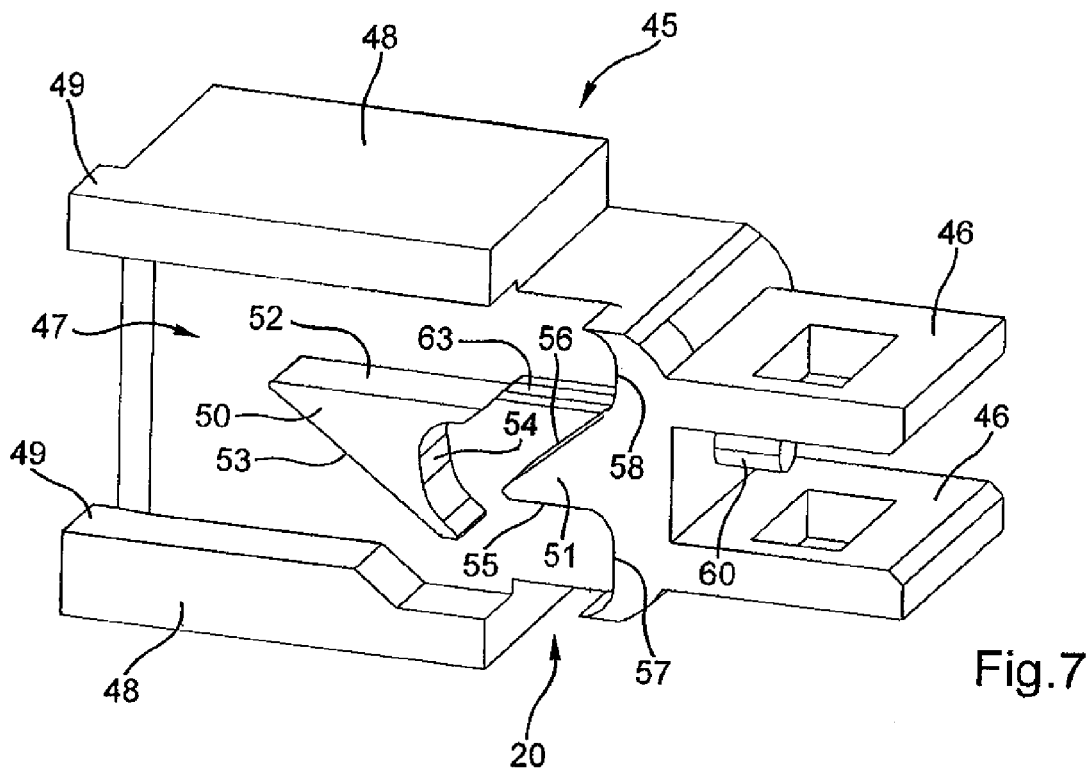
FIGS. 7 and 8 are perspective views of the slide visible in FIG. 2, the views respectively being from the cam surface side and from the opposite side to the cam surface.
Figure 8:
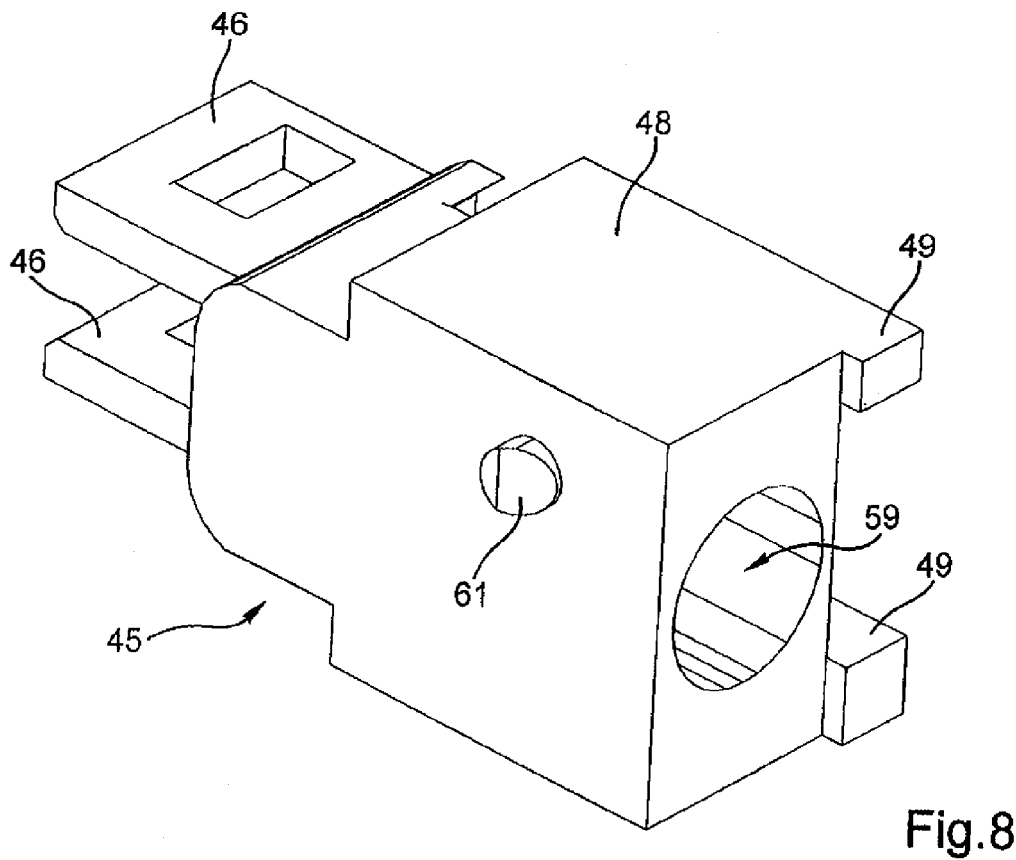

The clip 4 is adapted for snap engagement onto a slide 20 as represented in FIGS. 2, 7 and 8.

FIG. 2 illustrates a casing 21 and the slide 20 ready to be assembled to slide with respect to each other.

A spring (no shown) is furthermore adapted to be positioned between the slide 20 and the casing 21. Once the spring is in position, it is intended to fit the slide 21 into the casing 21.

Casing 21 is of rigid plastics material and comprises a hollow body 22 enclosed within a substantially parallelepiped form of which one of the faces is open, a collar 23 extending the hollow body 22 beyond said open face, and a member 24 for receiving the clip.

The collar 23 is itself enclosed substantially within a parallelepiped form, open from one side to the other.

The hollow body comprises a work face 25. The latter comprises a moveable elastic leg 27. To that end, the work face 25 is pierced by an opening 28 permitting the lateral displacement of the elastic leg 27 which has two elastic branches 29 to connect it to the base of said face 25.

The leg 27 is made elastic by its form and in particular by the small thickness of the branches 29.

The elastic leg 27 is constituted by a head 30 which, thanks to the provisions given earlier, is moveable in the plane of the work face 25, and by the two branches 29 which extend from the head 30, while diverging from each other so that each meets a corner 12 of the work face 25.

The branches 29 are disposed such that the head 30 is positioned, in the absence of urging, along a median position, parallel to the direction of sliding.

The elastic leg 27 comprises finally a follower 31 disposed on the head 30 and projecting inwardly of the casing 21.

The hollow body 22 of the casing 21 further comprises, on its back face remote from the collar 23, a rectangular opening and, on its opposite face from the work face 25, an elongate guide aperture 23.

Figure 6:
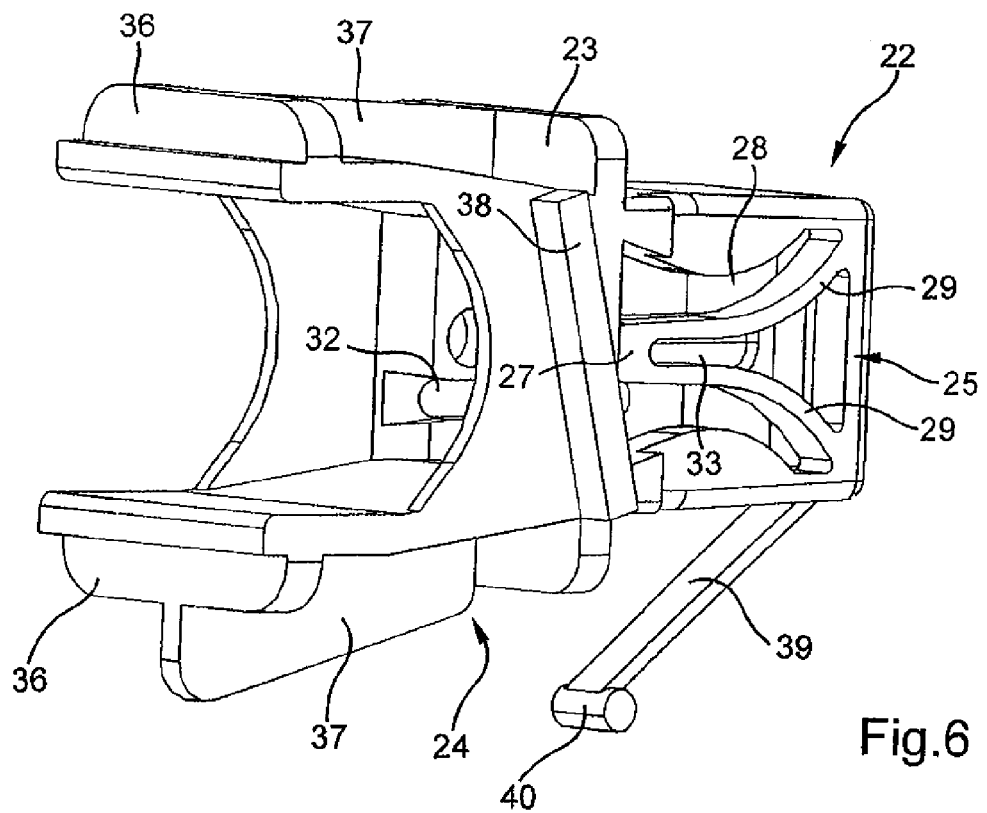

In FIG. 6 there is also visible a finger 33 forming a spring guide, this finger 33 projecting inwardly of the casing 21 from the inner surface of the back face.

The receiving member 24 comprises four walls 34, 35 each of which extends from collar 23. The walls 34 and respectively 35 extend facing each other.

The walls 34 are each oriented towards collar 23 and towards the opposite wall 34 over a first portion of wall 34 in the vicinity of the collar 23. Over a second portion of wall 34, which extends as far as the free end of wall 34, the two walls 34 are oriented away from collar 23, and slightly towards each other.

The walls 35 extend between two walls 34 and their free end is situated at the bend line of the walls 34 which each divide those two walls into two portions mentioned earlier. This free end is formed as a concave arc of a circle.

Walls 34, 35 delimit a receiving space for the clip 4.

On the services of the walls 34 that are exterior of the receiving space for the clip 4, fins 36 extend parallel to the collar 23. Each fin 36 faces a portion of collar 23 projecting from the receiving member 24.

On that same surface of the walls 34, a cross-member 37 extends transversely to the fin 36 and centered on surface 34. One of the cross-members 37 is of a height comparable to that of the fins 36, whereas the other cross-member 37 is of approximately twice the height of the fins 36, this height increasing progressively on moving away from the collar 23.

The receiving member 24 also comprises, towards the foot of the walls 35, a reinforcing member 38 of square section of which one end is situated at the collar 23 on the same side as one wall 34, whereas the other end is situated slightly away from the collar 23 on the same side as the other wall 34.

The casing 21 further comprises a long and flat projecting flexible leg 39. It extends from the back face of the body 22 with which it is molded in one piece. It has at that end the form of an arc of a circle which, starting from that rear face, enables it then to extend obliquely while it diverges from the body 22. The free end of the stem 39 is formed as a cylindrical chock 40.

FIGS. 7 and 8 represent the slide 20 alone. It comprises a body 45 to which are joined two snap engaging lugs 46 for snap engagement with the snap engaging stud 17 of the clip 4. The body 45 and the lugs 46 are molded in one piece.

The body 45 is a solid part having on one of its faces a planar cam surface 47, oriented towards the work face 25 of the casing 21 when the latter and the slide 20 are assembled.

The disposition of this cam surface 47, as well as the forms of the casing 21 and of the slide 20, are adapted such that, when the slide 20 is engaged in the casing 21, the follower 31 of the elastic leg 27 arrives next to the cam surface 47, without necessarily touching it.

Furthermore, two lateral walls 48 situated on respective sides of the cam surface 47, emerge parallel to the cam surface 47. These lateral walls 48 form guide surfaces enabling the follower 31 to be moved over the whole of the cam surface 47 without the risk of departing laterally from it.

The lateral wails 48 also each comprise a portion 49 projecting beyond the cam surface 47, at the opposite end to the lugs 46.

These portions 49 are adapted to fit into the opening of the casing 21 when the slide 20 is completely pushed into the casing 21.

Furthermore, the cam surface 47 also comprises projections in the form of a central island 50 and a peninsula 51.

The central island 50 projects perpendicularly to the cam surface 47, between the lateral walls 48 and substantially half-way up the cam surface 47. Its section is that of a triangle of which one of the sides is replaced by a curve bowed towards the inside of the triangle.

The central island 50 is of thickness substantially equal to the thickness of the side walls 48 these thicknesses being measured from the cam surface 47 and normal to it.

The central island 50 thus has three side edges 52, 53, 54, i.e. a vertical edge 52 arranged parallel to the sliding direction, an oblique edge 53 extending in the direction of one of the lateral walls, substantially along a diagonal of the cam surface 47, and a curved edge 54.

This curved edge 54 has a recessed form enabling it to receive the follower 31.

The peninsula 51 is arranged on one of the edges of the cam surface 47 remote from the portions 49. Its thickness is substantially equal to that of the central island 50 and of the lateral walls 48. It comprises a point directed towards the curved edge 54 of the central island 50.

The peninsula 51 comprises a vertical edge 55 which is parallel to the direction of sliding and is separated from the vertical edge 52 of the central island 50 by a distance, measured normal to the sliding direction, at least equal to the diameter of the follower 31.

The peninsula 51 comprises an oblique edge 56 which forms, with the vertical edge 55, the aforementioned point. This oblique edge 56 is connected to the end of the vertical edge 55 and is arranged obliquely in a direction substantially perpendicular to the direction in which the oblique edge 53 of the central island 50 extends and in the opposite direction to the central island 50.

The peninsula 51 is flanked on respective sides of the point formed by the edges 55, 56 by two stop edges 57, 58 arranged transversely to the sliding direction and adapted to form an abutment for the follower 31.

A stop edge 57 is adjacent to the vertical edge 55 of the peninsula 51, and the other stop edge 58 is adjacent to the oblique edge 56.

An anti-return rib 63 is provided between the vertical edge 52 and the stop edge 58.

The different edges define a cam track for the follower 31.

The slide 20 further comprises a hole 59 for receiving the spring.

The lugs 46 extend on the face of the slide 20 behind the stop edges 57, 58. These latter extend in parallel, transversely to the back face from which they project. They are rectangular and each have a rectangular aperture for the snap engagement of the clip 4. They have a ramp at their free end each of which cooperates with a guide slope 18 of the stud 17. After inserting the stud 17 by force between the lugs 46 (by deformation of the lugs 46), the regions of the detent jutting from the cubic base insert into the rectangular apertures of the lugs 46. A stud 60 forming an abutment is provided on the back surface of the slide 20 to prevent possible relative movement of the clip 4 and the slide 20.

On the opposite surface to the cam surface 47, the slide 20 has a snap engaging stud 61 having a ramp. The cooperation of the stud 61 with the guide aperture 32 of the casing 21 enables the movement of the slide 20 in the casing 21 to be guided.

The assembly formed by the clip 4 and the slide 20 is mounted in the casing 21 so as to make the portions 49 enter first, the assembly being pushed into the casing 21 until those portions 49 are positioned in the opening of the back face of the casing 21. The follower 31 is then positioned in contact with the cam surface 47 and the stud 61 in the aperture 32. The slide 20 and the casing 21 then form means for actuating the clip 4 and more specifically a locking/unlocking mechanism of push-push type with an unlocking position in which the slide 20 is spaced away from the back of the casing 21 and a locking position in which the slide 20 is fully home in the casing 21.

The clip 4, which is mounted by snap engagement with the slide 20, may take the two distinct positions, open and closed, which respectively correspond to the locking and unlocking positions of the slide 20.

In FIGS. 3, 4, 13 and 15, the clip 4 is in closed position which means that it is positioned with respect to the casing 21 such that each rib 15 is in contact with a wall 34. The walls 34 form an abutment and hold the bend lines 12 at a specific distance less than the distance which separates the hinges 9. In this closed position, the assembly formed by the inner surface of the wall 6 and the surfaces 10 of the flaps 7 have a cross-section in the form of an arc of a circle which extends over a contour longer than a semi-circle. Thus, a cylindrical journal of slightly lower diameter than the inner diameter of the wall 6 is held in clip 4 since the separation between the bend lines 12 which delimit an opening is markedly less than the diameter of the journal.

A journal is thus prevented from leaving the clip 4 even if pulling is applied. The elastic characteristics of the material of the clip 4, the frictional characteristics and the distance separating the bend lines 12, are chosen such that the deformation of the material in case of pulling do not permit passage of the journal to the exterior. Thus, the more the material chosen for the clip 4 is elastic, the more the rib 15 is thick in order to limit the effects of the possible deformation when pulling is exerted on a journal.

The chosen elastomer has a degree of pliability which is limited mainly in order to give a pleasant feel to the user, that is to say without shock and without shock noise.

When the journal is enclosed within the clip 4, the near-circular form of the contact surface between the journal and the clip 4 enables the pivoting of the journal around its axis. In its closed position, the clip 4 forms a bearing for the journal.

In the open position of the clip 4 which corresponds to its resting position, the surfaces 10 of the flaps 7 are not oriented towards each other, but on the contrary diverge from each other in the manner of the surfaces 11 in closed position. The bend lines 12 are then separated by a distance greater than the distance separating the hinges 9. The bend lines 12 then delimit an opening allowing the passage in or out of the journal.

A description will now be given of the foot 2 which is adapted to be inserted into an aperture of a support forming part of the bodywork of a motor vehicle, situated above the windscreen. It comprises a part 66 and a lock 67 fitted one inside the other.

Figure 9:
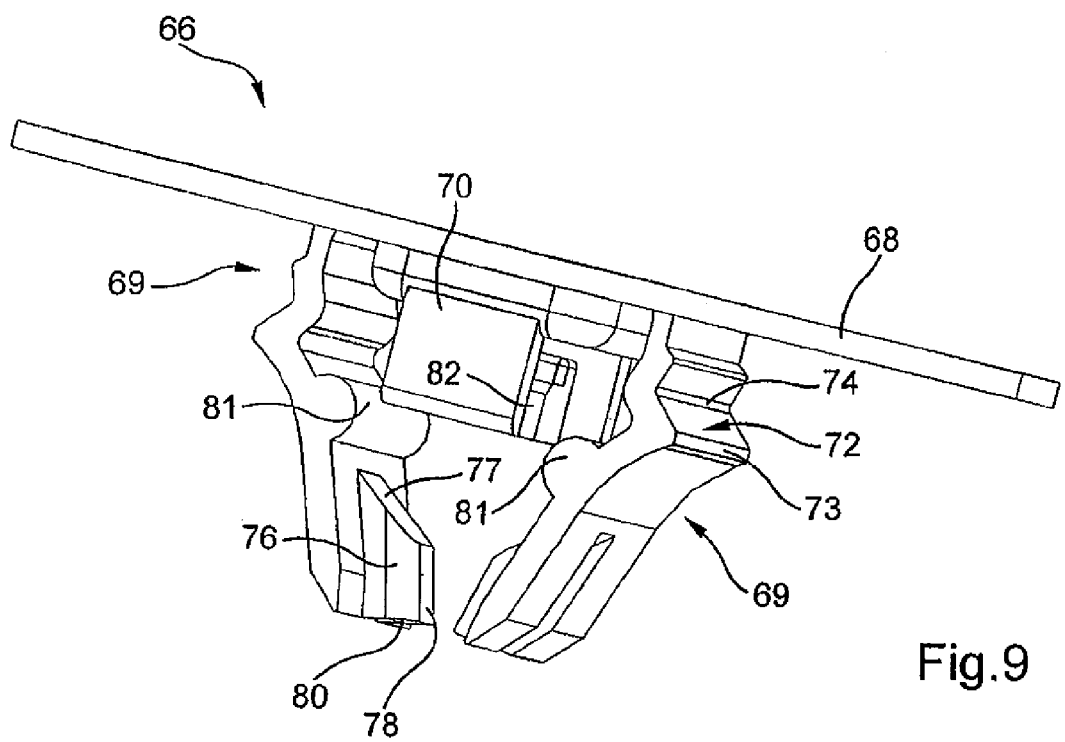
FIGS. 9 and 10 are perspective views of a part comprised by the fixing foot of the hook.
Figure 10:
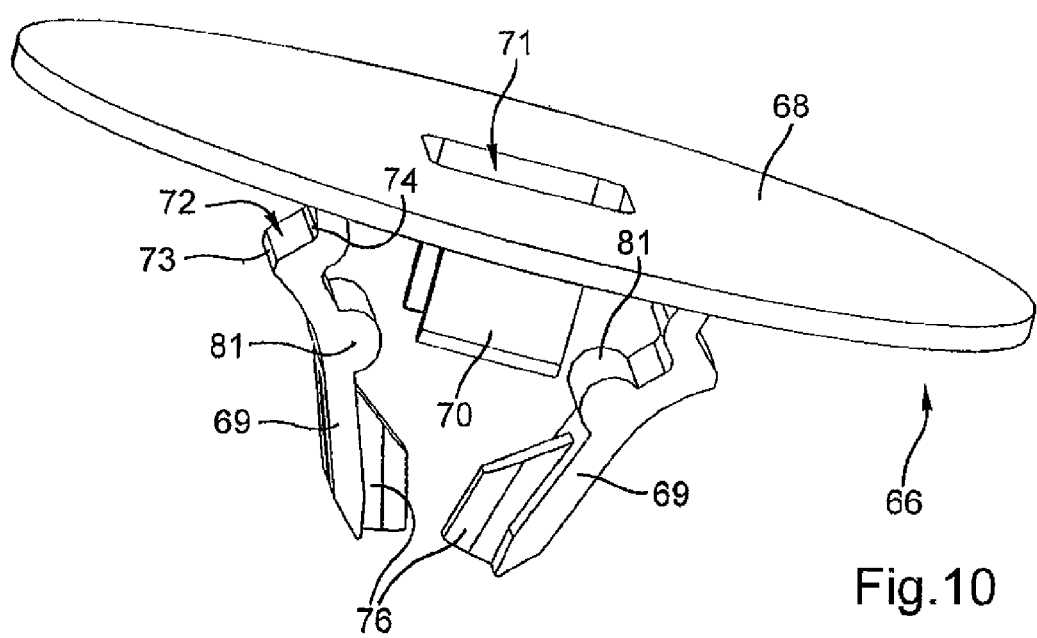
Figure 11:
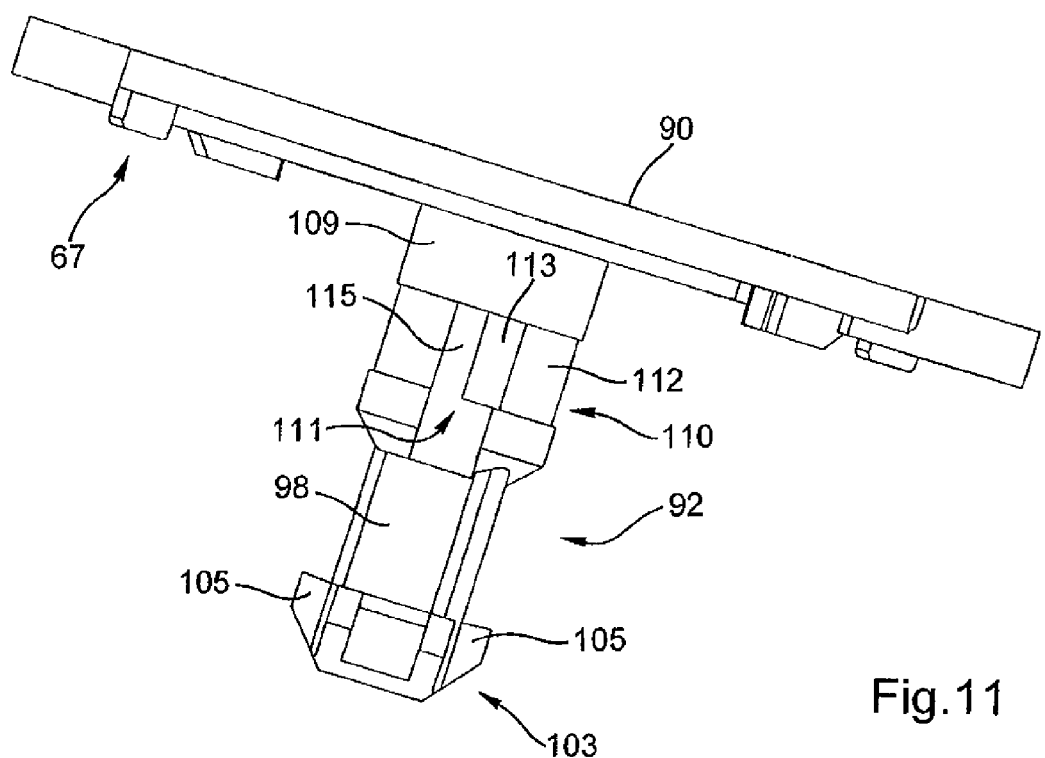
FIG. 11 is an elevation view of a lock comprised by the fixing foot of the hook.

Part 66 shown in particular in FIG. 9 is formed of plastics material as a one-piece molding. It comprises a plate 68, two flexible legs 69 and two flexible strips 70.

The plate 68 is planar. It has an outer periphery sufficiently large to completely cover a cup of the support at the back of which is located the insertion aperture for the foot 2. At its center, the plate 68 has a square-shaped opening 71, which issues between the legs 69 and between the strips 70.

The flexible legs 69 project from the plate 68 and are generally transversely oriented to the plate 68. They are symmetrical (mirror image) with respect to each other.

On the outward side, each of the legs 69 has a surface 72 inclined towards it free end and outwardly. After surface 72, going towards the free end, there is no surface oriented outwardly, the bend line 73 delimiting the surface 72 on the same side as the free end constituting the outermost location of the outward surface of each leg 69. A bend line 74 delimits the surface 72 on the same side as the plate 68.

In the absence of urging, the legs 69 adopt the resting position shown in FIG. 9 where the distance between the respective bend lines 73 corresponds approximately to the length of the insertion aperture.

The width of the legs 69 is constant over approximately their entire height, and substantially corresponds to the width of aperture 6.

In the resting position, the legs 69 may be inserted into the aperture as far as surface 72 without needing, or practically without needing, to fold them, such that this insertion is unforced.

If the legs 69 are then moved apart, surface 72 bears on the periphery of the aperture of the support which locks part 69 in the support.

The orientation of the outer surfaces between the surface 72 and the free end of the legs 69 facilitates the insertion thereof into the aperture of the support.

The connection zone between each leg 69 and the plate 68 is of smaller thickness than the rest of the legs, in order to facilitate their bending about that zone.

On the inner side, each of the legs 69 has a centered cam 76 of constant width extending over a certain length from the free end.

The surfaces 77, 78 of the cams 76, which are opposite each other, are all oriented inwardly and towards the free end. A surface 80 delimits the free end of the cams 76.

On the inward side, each of the legs 69 also comprises a boss 81 situated above cam 76 which comes to bear against a mast of the lock 67 and which maintains a specific separation between the legs 69.

The blades 70 have a generally constant thickness, and on its inward side each carries a narrow centered tooth 82.

The flexible blades 70 project from the body 68, on the same side as the legs 69. They are symmetrical (minor image) with respect to each other.

The lock 67, which constitutes the second part of the foot 62, is also a one-piece plastics molding. It comprises a plate 90 of circular outline, of slightly greater diameter than that of the plate 68, and a fixing mast 92.

The latter has a portion 96 of generally rectangular cross-section and a portion 97 of generally cylindrical form.

The diameter of portion 97 corresponds to the length of one side of the square-shaped opening 71 in part 66.

Figure 12:
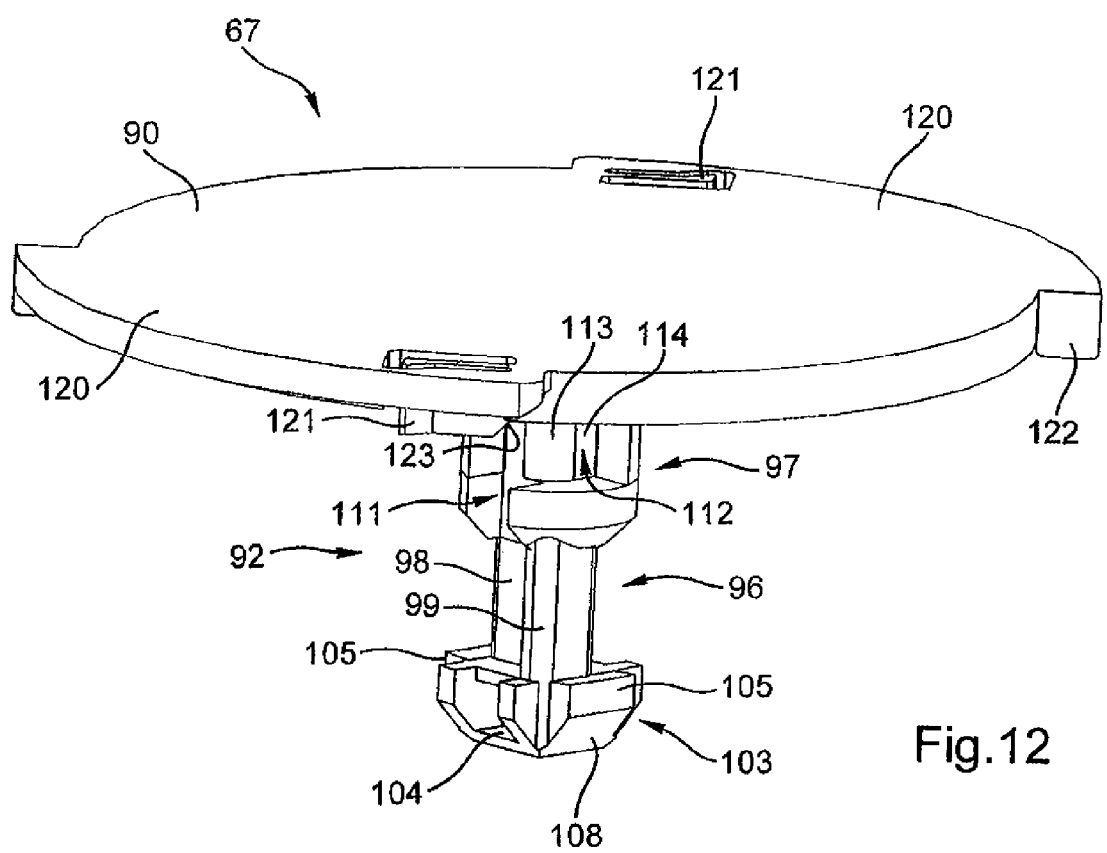
FIG. 12 is a perspective view of that lock.

Portion 96 extends over a certain length from the free end of the mast 92 (lower end in FIG. 12). It has a web 98 of rectangular section transversely oriented to the plate 90. It also comprises two flanges 99 that are transverse to web 98. Each flange 99 extends between portion 97 and the free end of portion 96. The cross-section in a plane parallel to plate 90 of web 98 and to the flanges 99 is S-shaped with two parallel branches disposed on respective opposite sides of a main branch and transversely thereto.

The web 98 has, starting at its free end and over a certain distance, a foot portion 103 whose thickness is approximately three times the remainder of web 98. The foot portion comprises two notches 104 situated on respective opposite sides of the web 98.

The thickness of web 98, in the portion thereof situated between foot portion 103 and portion 97 of mast 92, corresponds approximately to the distance which separates surfaces 78 of cams 76 in the resting position at the junction with surfaces 80.

On the outer side of each flange 99, mast 92 has a tooth 105 extending from the free end over the same distance as the foot portion 103.

Teeth 105 have a constant thickness which corresponds to that of foot portion 103. Teeth 105 each comprise a ramp 108 oriented towards the free end and inwardly.

Portion 97 of mast 92 has, starting from the plate, a segment 109 with a purely cylindrical cross-section and, between segment 109 and portion 96, a segment 110 having a channel 111 extending in line with the main surfaces of web 98.

Just below segment 109, portion 97 has two recesses 112, oriented transversely to the channels 111, that is to say having a general orientation parallel to plate 90.

Each of the recesses 112 comprises a back having a rounded surface 113 and a straight surface 114, oriented at 90.degree. with respect to the back surface 115 of channel 111, and situated at the same distance from the axis of lock 67. The rounded surface 113 has a quarter circle cross-section the diameter of which corresponds to the distance between the axis of the lock 67 and surface 114.

Thus, when each of the teeth 82 of part 66 is situated in a respective recess 112 of lock 67, with the free end of each tooth 82 bearing on one of the surfaces 115, it is possible to rotate lock 67 through 90.degree. with respect to part 66, the free end of the teeth 82 passing from surface 115 to surface 114 by sliding on surface 113.

Cams 76 pass from a position against and parallel to web 98 to a position transverse to web 98 and parallel to flanges 99.

On its periphery, plate 90 of lock 67, which is mainly circular, has two projecting portions 120 extending in the main plane of plate 90. These two portions 120 extend over opposite peripheral quarters such that plate 90 has a first diameter between those portions 120 and a second diameter slightly greater than the first diameter at those portions 120.

Portions 120 are symmetrical to each other, the center of symmetry being the center of plate 90.

A single portion 120 will be described. Portion 120 has at one of its ends a flexible leg 121 and at the other end an abutment 122. Flexible leg 121 forms a single piece with the rest of plate 90, is attached to plate 90 by a first end and extends within an elongate aperture formed on plate 90. Leg 121 is of greater thickness than the thickness of plate 90. The edge of zone 120 and one end of leg 121 adjacent to that edge have a common ramp 123.

Abutment 122 is a projection of parallelepiped form which extends at the end of zone 120 in a direction transverse to plate 90 and on the same side as mast 92.

Figure 13:
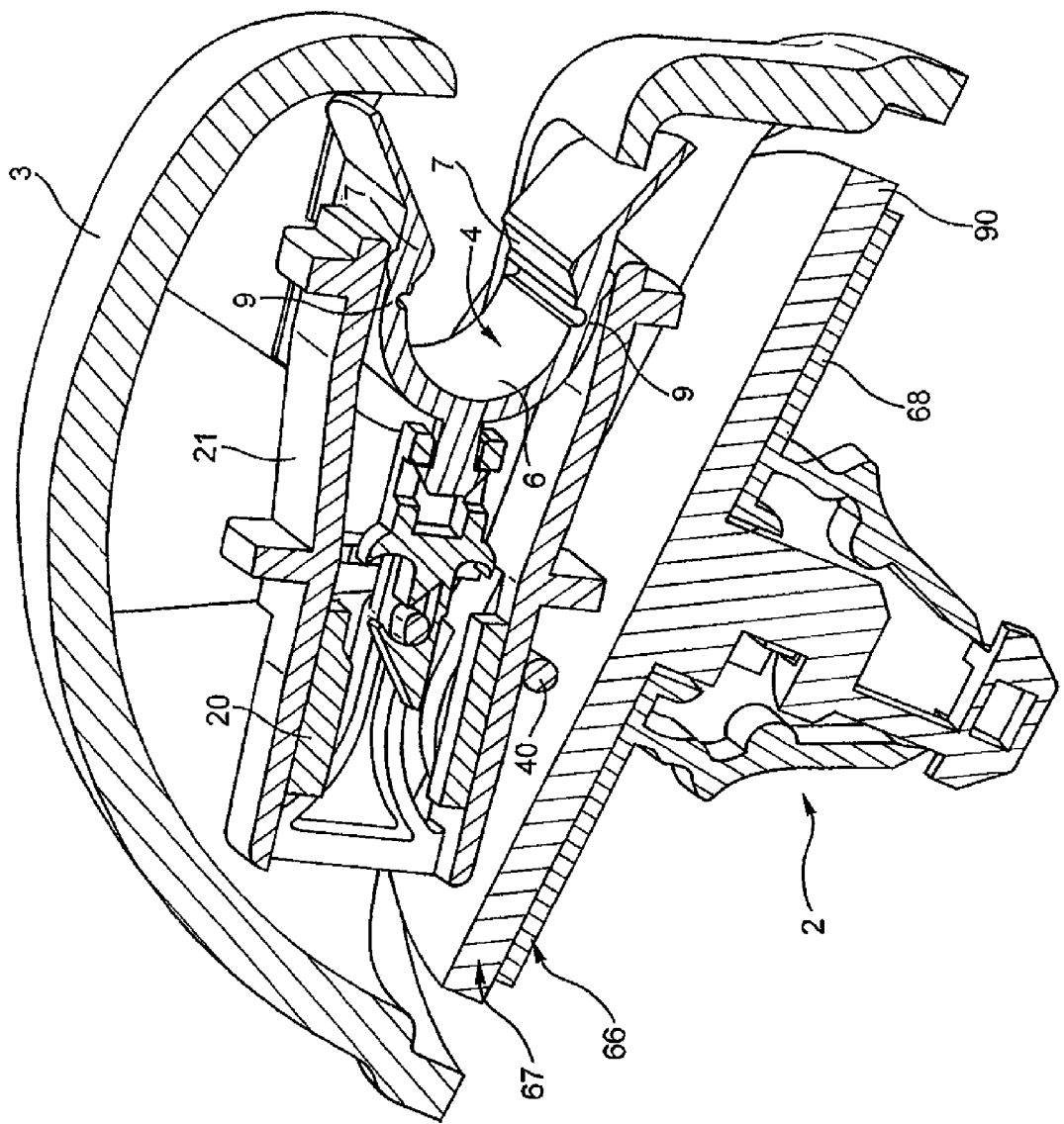
FIG. 13 is a perspective cross-section view of the clip in its closed position.
Figure 14:
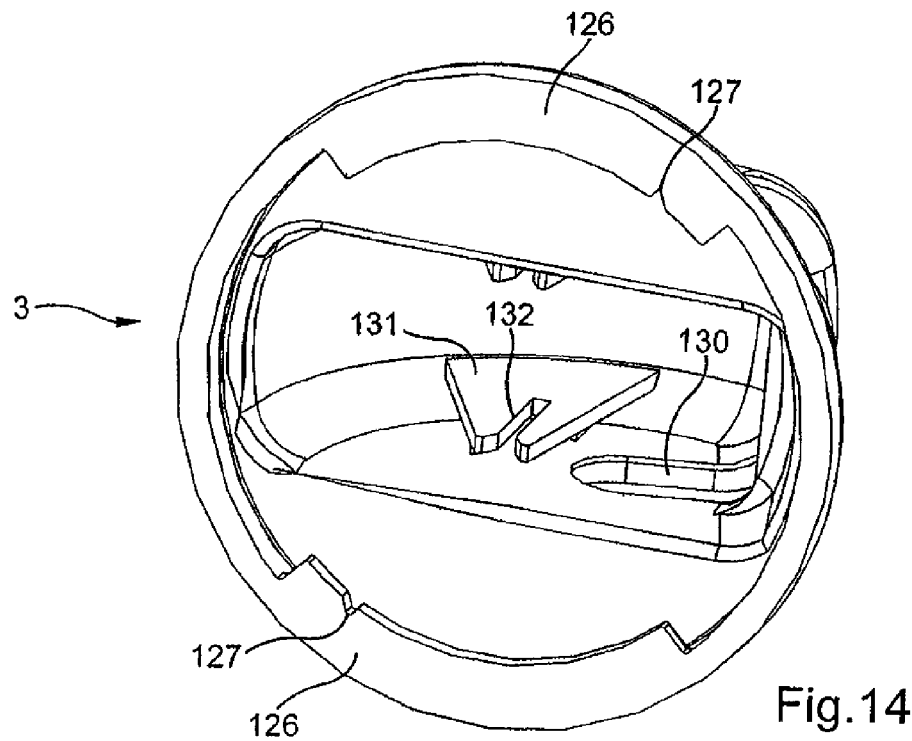
FIG. 14 is a perspective view of the body of the hook.
Figure 15:
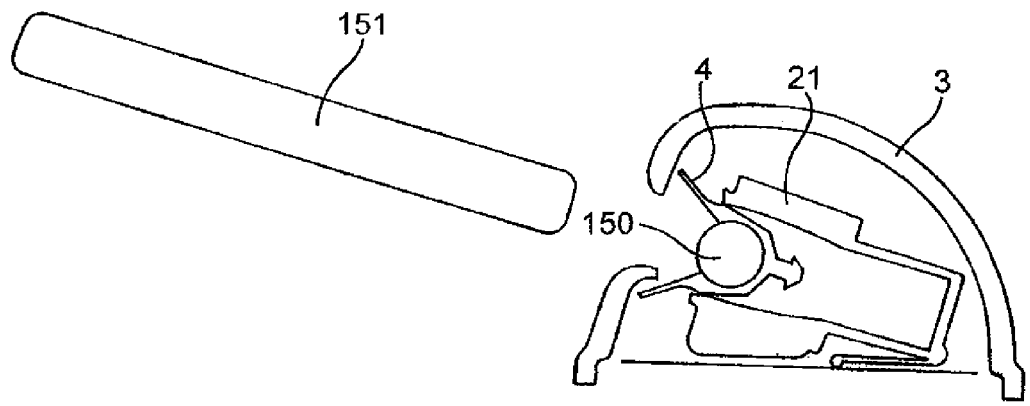
FIG. 15 is a diagrammatic cross-section view showing the hook cooperating with the journal, with the clip of the hook in closed position around the journal, the foot not having been shown.

Body 3, which has the form of a shell, will now be described with reference to FIGS. 1, 13 and 14. Body 3 is a single hollow convex piece of plastics material. It has a circular base 125 delimiting a generally circular opening. Base 125 has two opposite rims 126 each extending over quarter of the periphery of base 125. Each rim extends inwardly. Each rim 126 comprises a triangular indent 127 of small size disposed near one of the two ends of the rim 126. The two indents 127 are diametrically oppositely disposed.

Starting from base 125, the wall of body 3 converges towards a diametral plane before rising to give the convex form of body 3. This convex portion of body 3 has a cut-out 130. Cut-out 130 delimits an opening for the passage of a sun visor journal. Cut-out 130 extends from a front face of body 3 and extends laterally towards the rear face as far as the center of the lateral faces. Thus, a journal portion may be inserted into body 3 in a direction transverse to its main axis by virtue of cut-out 130.

From the inner surface of body 3 extending on the opposite side from the opening defined by base 125, extend two triangular panels 131 projecting towards the base 125. These panels 131 are parallel and each comprises a rectilinear groove 132 which extends from the vertex close to the base 125 towards the center of the panel 131.

The manner of assembly of the hook is now described. Clip 4 is snap-engaged with the slide 20 and the assembly is inserted into casing 21.

Clip 4, slide 20 and casing 21 are next inserted together into body 3, the insertion being guided by the sliding of the reinforcing members 38 of casing 21 in the grooves 132 of the panels 131. The assembly is fully inserted when reinforcing member 38 comes into abutment with the bottom of the groove 132. In this position, clip 4 fully faces the opening delimited by the cut-out 130 in body 3. Lock 67 is next fixed onto body 3. For this, plate 90 is brought towards base 125, and the portions 120 approach base 125 facing the portions of that base 125 which lack rims 126. Lock 67 is pushed in until plate 90 has just gone beyond the thickness of the rims 126. Due to the presence of the rims 126 and the portions 120, only two symmetrical positions relative to the lock 67 and the body 3 are possible for this approach.

In this position, each leg 121 is situated away from an indent 127. The body 3 and the lock 67 are made to turn with respect to each other, this rotation being made possible initially by virtue of the ramps 123 of legs 121; once the legs 121 have passed behind the rims 126, the rotation is continued until the legs 121 cooperate with the indents 127 and, concomitantly, the opposite ends of the rim 126 to the indents 127 abut with the abutments 122 of the lock 67.

In this configuration, leg 39 is crushed between the plate 90 and the casing 21 such that the leg enables the casing 21 to be trapped in the space delimited by the inner surface of the body 3 and the facing surface of the plate 90. It also enables possible vibrations between these different parts to be damped.

Part 66 and the preceding assembly are then pre-assembled in a waiting configuration not shown, in which part 66 and lock 67 are joined to each other by virtue of the fact that the teeth 82 are accommodated in the notches of the foot portion 103.

To reach this position, the lock 67 is presented to face part 66 with mast 92 facing plate 68, while seeking to make the longitudinal and transverse planes of symmetry of the two parts coincide, and mast 92 is pushed into opening 71. Given the dimensions stated earlier, mast 92 inserts freely into opening 71, then foot portion 103 comes into contact on respective opposite sides with a respective tooth 82 of lock 67.

When the movement of pushing mast 92 into aperture 71 is continued, the cooperation between foot portion 103 and tooth 82 causes the flexible blades 70 to move apart, the end of the blades 70 slides on the lateral walls of the foot portion 103, and ends up being located in a notch 104. A waiting configuration has then been attained.

Cooperation of blades 70 provided with the teeth 82, with the notches 104 of the foot portion 103, provides quality fixing ensuring good retainment.

It will be observed that, in the waiting configuration, the legs 69 of lock 67 are not in contact with mast 92, and therefore remain in their resting position.

A description will now be given of the insertion into the support and the fixing of hook 1 to the support in the ceiling of a vehicle. The operator grasps the body 3 and presents flexible feet 69 first, aligned with the opening of the support, into which he pushes them.

As explained previously, feet 69 pass through the opening of the support without requiring effort by the operator, and when surfaces 72 of the respective feet are level with the opening, the surface of the plate 68 on the same side as the feet 69 comes to bear on the surface of the support, which prevents part 66 from being pushed in further.

The pushing-in force which the operator continues to exert has the effect of causing the flexible blades 70 to move apart, such that the teeth 82 escape from the notches 104 and the mast 92 is pushed in with respect to the part 66. The movement continues as far as the locking configuration shown in FIG. 1.

When passing from the waiting configuration to the locking configuration, the end of the blades 70 slides first of all beyond the notches 104 on the walls of the foot portion 103, then moves more or less freely in relation to the web 98, and finally, when the teeth 82 engage in the respective channels 111, comes to bear on the bottom 115 of those channels, each tooth 21 being housed in a respective recess 112 when the article is in the locking configuration.

With regard to the cooperation of the mast 92 and the legs 92 when passing from the waiting configuration to the locking configuration, contact is established only after a certain degree of insertion, when the ramps 108 on the teeth 105 each encounter a surface 77 on a respective cam 76.

When the pushing-in movement is continued, the ramps 108 slide successively over the surfaces 77, 78, such that that the legs 69 move apart, then the surfaces situated above the ramps 108 slide over the surfaces 79, which they finally move beyond, such that the feet 69 relax slightly.

As explained previously, the cooperation between the surfaces 72 and the edges of the opening means that part 66 is locked in relation to the support.

As for the piece 67, this is locked in relation to part 66 since it can neither be pushed in further nor be extracted from part 66 (cooperation of the cams 76 and teeth 105), nor be shifted laterally (cooperation of the cylindrical portion 109 of the mast 92 with the square-shaped opening 71).

If, for some reason, the operator wishes to demount the article, it suffices for him to grasp hook 1 in order to pivot the lock 67 through 90.degree. with respect to part 66.

As explained above, this rotational movement is allowed, with regard to cooperation of the mast 92 with the blades 70, by the recesses 112.

As regards the cooperation between mast 92 and the feet 69, the cams 76 are in locking position transversely to web 98 then by rotation come against web 98 such that web 98 presents along each main surface a cam 76 and a web 99, a web 99 facing a respective cam 76.

Due to the positioning of cams 76, the feet 69 are once again in their position of rest or approximately so, that is to say in the unlocking configuration shown in FIG. 1.

It suffices to pull on the body 3 of hook 1 to extract the hook, which has suffered no deterioration.

It can be seen that hook 1 can be both assembled and disassembled without tools and with moderate effort by the operator.

It will be observed that the hook 1, compared with the conventional sun visor hooks fixed with a screw, has the advantage of not having a passage hole for the screw which influences its form (in conventional hooks, the hole must not pass through the hollow for receiving the journal) and which adversely affects mechanical strength.

The use of the hook fixed into the ceiling of a car will now be described. Hook 1 is adapted to lock a journal 150 of a sun visor 151 when the clip 4 is in closed position and to allow release thereof from the hook when the clip 4 is in open position.

Figure 16:
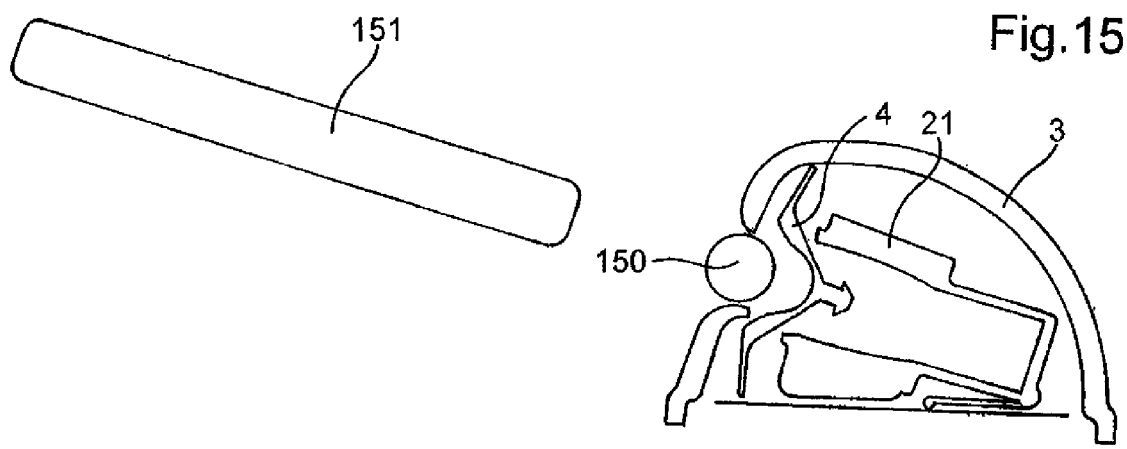
FIG. 16 is a cross-section view similar to the view in FIG. 15, on which the clip is in open position.

When the slide 20 is in unlocking position, clip 4 is in open position (FIG. 16). In this position, ribs 15 are advanced out of the receiving member 24. Moreover the bend lines 12 are separated from each other by a distance greater than the diameter of the journal 150.

The journal 150 is approached towards hook 1 until it enters hook 1 by the opening delimited by the cut-out 130. On account of the distance between the bend lines 12, the journal 150 enters until it comes into contact with the wall 6.

When pushing on journal 150 is continued, still in the same direction of insertion, the pushing is transmitted from the clip 4 to the slide 20 and the latter is urged to the back of the housing 21 until follower 31 enters into contact with the stop surface 57. The pressure on the journal 150 is then released and follower 31 comes into place against the curved edge surface 54.

Slide 20 is then in its locking position which corresponds to the closed position of the clip 4 of which the catching portions have been partially driven into the receiving member 24 such that ribs 15 have entered into contact with walls 34 enabling the catching portions to close onto journal 150.

Wall 6 and flaps 7 then form a bearing for the journal 150 of which the distance between the bend lines 12 prevents the journal 150 from coming out.

In this position of clip 4, journal 150 is free to turn about its axis such that it is possible to orientate the sun visor as desired between a position against the ceiling of the passenger compartment and a position against the windshield.

In this position, if a passenger pulls on the sun visor, for example in order to pivot the sun visor against the pane or to get out of or into his seat, the journal 150 remains locked by clip 4 and is thus not pulled out of hook 1.

To free journal 150, it is necessary to press in the same direction as beforehand. The follower 31 is guided along the oblique edge surface 56 as far as the stop surface 58. The user then releases the pressure and follower 31 moves along the vertical edge surface 52.

Under these conditions, clip 4 then recovers its open position (FIG. 16) and the journal may then be extracted from clip 4.

According to another embodiment of the invention, the hook does not comprise a fixing foot, and is fixed to the support by bonding or screwing.

The invention claimed is:

1. A hook for receiving a journal of a pivoting sun visor of a vehicle, said hook comprising:
    a body, and
    within said body, a clip for coupling to said journal and actuating means for actuating said clip, said clip defining a receiving space for receiving said journal and an opening for inserting said journal in said receiving space,
    said clip comprising a semi-cylindrical wall and two flaps,
    said wall having a bearing surface for said journal,
    each said flap having a contact surface extending onwards from said bearing surface,
    said clip further comprising, at each junction between the bearing surface and the contact surface of a respective one of said flaps, a hinge for pivotally hinging said respective flap with respect to said wall,
    each said contact surface having an end remote from the respective hinge,
    said clip having a closed position in which said flaps have come towards each other and in which said contact surfaces and said bearing surface form a bearing for said journal,
    said clip further having an open position in which the distance separating said ends of said contact surfaces is greater than the distance separating said hinges for freeing of said journal from said receiving space and for insertion of said journal into said receiving space, and
    the passage of said clip from one to the other of said positions being actuated by said actuating means by pressing of said journal on said wall.

2. A hook according to claim 1, wherein each said flap comprises, on a surface opposite to the contact surface thereof, a rib situated away from the respective hinge.

3. A hook according to claim 2, further comprising a casing having two opposite surfaces,
    each rib of said clip being held against a respective one of said opposite surfaces of the casing when said clip is in the closed position whereas each said rib is free when said clip is in the open position.

4. A hook according to claim 1, wherein the clip is of one piece construction, said hinges being formed by a thinner portion than said wall and said flaps.

5. A hook according to claim 1, wherein said clip is molded in one piece of plastics material.

6. A hook according to claim 5, wherein said plastics material of said clip is elastomer.

7. A hook according to claim 1, wherein said actuating means comprise a slide and a casing mounted in said body,
said casing comprising a follower, and
said slide being mounted in said casing and comprising a cam track within which the follower of said casing adapted to be moved.

8. A hook according to claim 7, wherein said clip is engageable by snap engagement onto said slide.

9. A hook according to claim 7, wherein said casing is fittable into said body.

10. A hook according to claim 7, wherein said casing comprises means for elastically wedging said casing into said body.

11. A hook according to claim 7, wherein said casing comprises a flexible leg extending from one wall of said casing for elastic wedging of said casing into said body.

12. A hook according to claim 1, further comprising:
a foot for fixing to a support.

13. A hook according to claim 12, further comprising:
a casing,
a slide mounted in said casing, said clip being fixed onto said slide, and
a base delimiting a circular opening,
said foot comprising a lock having a plate adapted to obturate said opening of the base,
said body and said plate delimiting a space in which said casing, said slide and said clip are disposed.

14. A hook according to claim 13, wherein said casing comprises a flexible leg extending from a wall of said casing as far as said plate for elastic wedging of said casing into said body.

15. A hook according to claim 13, wherein said plate and said base comprise means for locking said body onto said lock.

16. A hook according to claim 13, wherein
said foot further comprises: a part comprising two flexible legs and a further plate for bearing against said support,
said flexible legs are attached to said further plate,
said further plate is provided with an opening of a predetermined outline between said flexible legs,
said legs assuming a resting position in the absence of urging and, by moving apart from said resting position, assuming a locking position onto said support;
said lock comprises a mast adapted to cooperate with said part and having a free end introducible through said opening of said further plate to bring said hook to a locking configuration in which said mast holds said flexible legs apart in said locking position, and
said lock is engageable by snap engagement with said part.

17. A hook according to claim 16, wherein, from said locking configuration, the lock is pivotable coaxially with respect to said part, to attain an unlocking configuration in which said mast allows said flexible legs to come together to attain said resting position.

18. A hook for receiving a journal of a pivoting sun visor of a vehicle, said hook comprising
a body, and
within said body, a clip for coupling to said journal, said clip defining a receiving space for receiving said journal and an opening for inserting said journal in said receiving space;
said clip comprising a semi-cylindrical wall and two flaps,
said wall having a bearing surface for said journal,
each said flap having a contact surface extending onwards from said bearing surface,
said clip further comprising, at each junction between the bearing surface and the contact surface of a respective one of said flaps, a hinge for pivotally hinging said respective flap with respect to said wall,
each said contact surface having an end remote from the respective hinge,
said clip having an open position in which the distance separating said ends of said contact surfaces is greater than the distance separating said hinges for freeing of said journal from said receiving space and for insertion of said journal into said receiving space,
said clip further having a closed position in which said flaps are closer to each other than in the open position and in which said contact surfaces and said bearing surface form a bearing for said journal, and
said clip being actuated to move from one of said positions to the other upon pressing on said wall.

19. A hook according to claim 18, further comprising a slide and a casing mounted in said body for actuating said clip to move between the positions upon pressing on said wall,
said casing comprising a follower, and
said slide being mounted in said casing in engagement with said clip, and comprising a cam track within which the follower of said casing is adapted to be moved.

20. A hook according to claim 19, wherein
each said flap comprises, on a surface opposite to the contact surface thereof, a rib situated away from the respective hinge,
said casing has two opposite surfaces, and
each rib of said clip is held against a respective one of said opposite surfaces of the casing when said clip is in the closed position, whereas each said rib is free when said clip is in the open position.

* * * * *